United States Patent
Ho et al.

(10) Patent No.: US 7,206,883 B2
(45) Date of Patent: Apr. 17, 2007

(54) INTERRUPTION CONTROL SYSTEM AND METHOD

(75) Inventors: Tony Ho, Taipei (TW); Chung-Ching Huang, Taipei (TW); Norman Chung, Taipei (TW)

(73) Assignee: Via Technologies, Inc., Taipei (TW)

( * ) Notice: Subject to any disclaimer, the term of this patent is extended or adjusted under 35 U.S.C. 154(b) by 191 days.

(21) Appl. No.: 10/945,000

(22) Filed: Sep. 20, 2004

(65) Prior Publication Data

US 2005/0086407 A1    Apr. 21, 2005

(30) Foreign Application Priority Data

Oct. 15, 2003   (TW) ............................. 92128622 A

(51) Int. Cl.
  *G06F 13/24*   (2006.01)
  *G06F 13/36*   (2006.01)
  *G06F 1/00*    (2006.01)

(52) U.S. Cl. ................. 710/260; 710/306; 713/322

(58) Field of Classification Search ............. 710/260, 710/266, 305–306, 313–315; 713/320, 322
See application file for complete search history.

(56) References Cited

U.S. PATENT DOCUMENTS

| | | | |
|---|---|---|---|
| 5,857,090 A | | 1/1999 | Davis et al. |
| 6,065,122 A | * | 5/2000 | Wunderlich et al. ........ 713/320 |
| 6,697,387 B1 | | 2/2004 | Larson |
| 6,823,414 B2 | * | 11/2004 | Radhakrishna .............. 710/262 |
| 6,983,339 B1 | | 1/2006 | Rabe et al. |
| 7,039,755 B1 | * | 5/2006 | Helms ......................... 711/106 |
| 2002/0083349 A1 | * | 6/2002 | Khatri et al. ............... 713/300 |
| 2003/0018892 A1 | | 1/2003 | Tello |
| 2003/0081741 A1 | * | 5/2003 | Anne et al. ............... 379/93.01 |
| 2004/0003322 A1 | | 1/2004 | Collins et al. |
| 2005/0114723 A1 | * | 5/2005 | Ho et al. ..................... 713/323 |
| 2005/0120154 A1 | * | 6/2005 | Ho et al. .................... 710/260 |
| 2006/0047984 A1 | * | 3/2006 | Ho et al. .................... 713/300 |

OTHER PUBLICATIONS

Rieker, Mike. "Advanced Programmable Interrupt Controller". Revision 1.1.1.1. Jul. 2, 2002. pp. 1-8. Retrieved from Internet May 20, 2006. <http://osdev.berlios.de/pic.html>.*
Advanced Configuration and Power Interface Specification. Revision 2.0. Jul. 27, 2000. Compaq Computer Corporation et al. Chapters 1-4. pp. i-xiv and 1-84.*
Mike Rieker; "Advanced Programmable Interrupt Controller"; Jul. 7, 2002; retrieved from Internet Jul. 21, 2006; http://osdev.berlios.de/pic.html.

* cited by examiner

*Primary Examiner*—Glenn A. Auve
*Assistant Examiner*—Thomas J. Cleary

(57) ABSTRACT

An interruption control system includes a first input/output interruption controller, a second input/output interruption controller, and an interruption control device bus. The first input/output interruption controller is coupled to a first peripheral device and a south bridge chip, and asserts a wake-up signal to the south bridge chip in response to a first interrupt signal issued by the first peripheral device so as to deactivate a power-saving state of the computer system. The second input/output interruption controller is coupled to a second peripheral device and a north bridge chip, and asserts a third interrupt signal in response to a second interrupt signal issued by the second peripheral device. Via the interruption control device bus, the third interrupt signal is transmitted from the second input/output interruption controller to the first input/output interruption controller, wherein the first input/output interruption controller asserts the wake-up signal to deactivate the power-saving state of the computer system in response to the third interrupt signal.

17 Claims, 4 Drawing Sheets

INTERRUPTION CONTROL SYSTEM AND METHOD

FIELD OF THE INVENTION

The present invention relates to an interruption control system, and more particularly to an interruption control system for use with a computer system. The present invention also relates to an interruption control method of a computer system.

BACKGROUND OF THE INVENTION

Power-saving means is widely used to minimize power consumption in a computer system. Many kinds and levels of power-saving modes are developed to achieve the purpose. One of the examples is so-called as ACPI. ACPI (Advanced Configuration and Power Management Interface) is a specification defining standard interfaces for hardware configuration and power management of the power-saving means. According to the ACPI specification, the central processing unit (CPU) of the computer system operates in various power states, e.g. C1, C2, C3, etc. Different power states result in different levels of power saving effects. For any power-saving mechanism, it is important to reduce power consumption while providing a stable operational environment for circuit at a relatively low temperature.

Generally speaking, the power management for the CPU of the computer system is implemented with the south bridge chip of the chipset. Referring to a conventional computer scheme of FIG. 1, for activating and deactivating power-saving modes, the south bridge chip 2 includes a stop clock control module 20 coupled to the CPU 1 and north bridge chip 3, and an interrupt control device 22 coupled to the stop clock control module 20 and one or more peripheral equipment, e.g. peripheral device 4.

When the operating system (OS) of the computer system is to enter a power-saving state, the CPU 1 asserts a sleep command to the south bridge chip 2. In response to the sleep command, the stop clock control module 20 of the south bridge chip 2 asserts a stop clock signal STPCLK# to the CPU 1 via a clock signal pin 21. Once the STPCLK# signal is generated, the CPU 1 asserts a stop grant signal STPGNT to the south bridge chip 2 via the north bridge chip 3 through data buses connecting thereto. In response to the STPGNT signal, the CPU 1, as well as the entire computer system, enters the power-saving state so as to reduce power consumption.

Afterwards, the CPU 1 can be awaked when interrupted by any of the peripheral devices. For example, in response to the receipt of an interrupt signal asserted by the peripheral device 4 via the interrupt signal pin 40, the interrupt control device 22 of the south bridge chip 2 issues a wake-up signal to trigger the stop clock control module 20 of the south bridge chip 2 to de-assert the STPCLK# signal. Thus, the CPU 1 and the entire computer system are awaked to recover to the normal operation state.

With the increasing number and variety of peripheral devices and promotion of computer performance, new and diverse architectures of computer systems have been developed. For example, the computer system may involve a plurality of input/output advanced programmable interrupt controllers (10 APICs). Particularly, as shown in FIG. 2, peripheral equipment such as peripheral device 6 can be connected to the north bridge chip 3 other than the south bridge chip 2, and respective 10 APICs 25 and 50 are arranged in the south bridge chip 2 and north bridge chip 3. The peripheral device 6 is communicable with the north bridge chip 3 via a PCI (peripheral component interconnect)-to-PCI bridge device 5, and the IO APIC 50 is disposed in the PCI-to-PCI bridge device 5. When the interruption is asserted by the peripheral device 4 connected to the south bridge chip 2 during the power-saving period, the STPGNT signal can be de-asserted via the clock signal pin 21 connected between the south bridge chip 2 and the CPU 1, as mentioned above. The PCI-to-PCI bridge device 5 where the IO APIC 50 is disposed, however, is not coupled to stop clock control module 20 as the IO APIC 25 does. Therefore, the CPU 1 or the computer system cannot be effectively awaked by the peripheral device 6 from the power-saving state to the normal operation state.

SUMMARY OF THE INVENTION

The present invention provides an interruption control system for use with a computer system, which can effectively wake up the computer system from the power-saving state to the normal operation state when any peripheral device asserts an interrupt signal.

In accordance with a first aspect of the present invention, there is provided an interruption control system for use with a computer system. The computer system comprises a CPU, a north bridge chip, a south bridge chip, a first peripheral device and a second peripheral device. The interruption control system comprises a first input/output interruption controller, a second input/output interruption controller, and an interruption control device bus. The first input/output interruption controller is coupled to the first peripheral device and the south bridge chip, and asserts a wake-up signal to the south bridge chip in response to a first interrupt signal issued by the first peripheral device so as to deactivate a power-saving state of the computer system. The second input/output interruption controller is coupled to the second peripheral device and the north bridge chip, and asserts a third interrupt signal in response to a second interrupt signal issued by the second peripheral device. Via the interruption control device bus, the third interrupt signal is transmitted from the second input/output interruption controller to the first input/output interruption controller, wherein the first input/output interruption controller asserts the wake-up signal to deactivate the power-saving state of the computer system in response to the third interrupt signal.

In an embodiment, the interruption control system further comprises a stop clock control module coupled to the first input/output interruption controller and the CPU, and asserting a stop clock signal to have the CPU deactivate the power-saving state in response to the wake-up signal.

In an embodiment, the first input/output interruption controller and the stop clock control module are integrated into the south bridge chip.

In an embodiment, the first input/output interruption controller is an input/output advanced programmable interrupt controller.

In an embodiment, the second input/output interruption controller is an input/output advanced programmable interrupt controller disposed in a bus bridge chip between the north bridge chip and the second peripheral device.

Preferably, the bus bridge chip is a PCI-to-PCI bridge chip.

Preferably, the interruption control device bus is an advanced programmable interrupt control device bus.

In accordance with a second aspect of the present invention, there is provided an interruption control system for use with a computer system. The computer system comprises a CPU, a north bridge chip, a south bridge chip, a first peripheral device and a second peripheral device. The interruption control system comprises a first input/output interruption controller, a second input/output interruption controller and a stop clock control module. The first input/output interruption controller is coupled to the first peripheral device and the south bridge chip. The second input/output interruption controller is coupled to the second peripheral device and the north bridge chip, and further communicates with the first input/output interruption controller via an interruption control device bus. The stop clock control module is coupled to the first input/output interruption controller and the CPU, and deactivates a power-saving state of the computer system in response to an interrupt signal from either of the first and second peripheral devices.

In an embodiment, the first input/output interruption controller monitors the interruption control device bus to determine whether the interrupt signal from the second peripheral device is issued via the second input/output interruption controller.

In accordance with a third aspect of the present invention, there is provided an interruption control method of a computer system. The computer system comprises a CPU, a north bridge chip, a south bridge chip, a first peripheral device coupled to the south bridge chip, a second peripheral device coupled to the north bridge chip via a bus bridge chip and a specified bus interconnecting the south bridge chip, the bus bridge chip and the CPU. Firstly, a first interrupt signal is issued to the specified bus in response to a second interrupt signal from the first peripheral device. Then, a third interrupt signal is issued in response to a fourth interrupt signal from the second peripheral device. Afterward, a wake-up signal is asserted to deactivate a power-saving state of the computer system in response to either the second interrupt signal or the fourth interrupt signal.

In an embodiment, the wake-up signal is asserted when a first input/output advanced programmable interrupt controller disposed in the south bridge chip monitors and detects either the second interrupt signal or the fourth interrupt signal on the specified bus.

In an embodiment, the wake-up signal is asserted by the first input/output advanced programmable interrupt controller to have a stop clock control module disposed in the south bridge chip and coupled to the first input/output interruption controller and the CPU de-assert a stop clock signal so as to deactivate the power-saving state of the computer system.

In an embodiment, the second interrupt signal is issued by the first input/output advanced programmable interrupt controller, and the fourth interrupt signal is issued by a second input/output advanced programmable interrupt controller disposed in the bus bridge chip and electrically connected to the first input/output advanced programmable interrupt controller via the specified bus.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
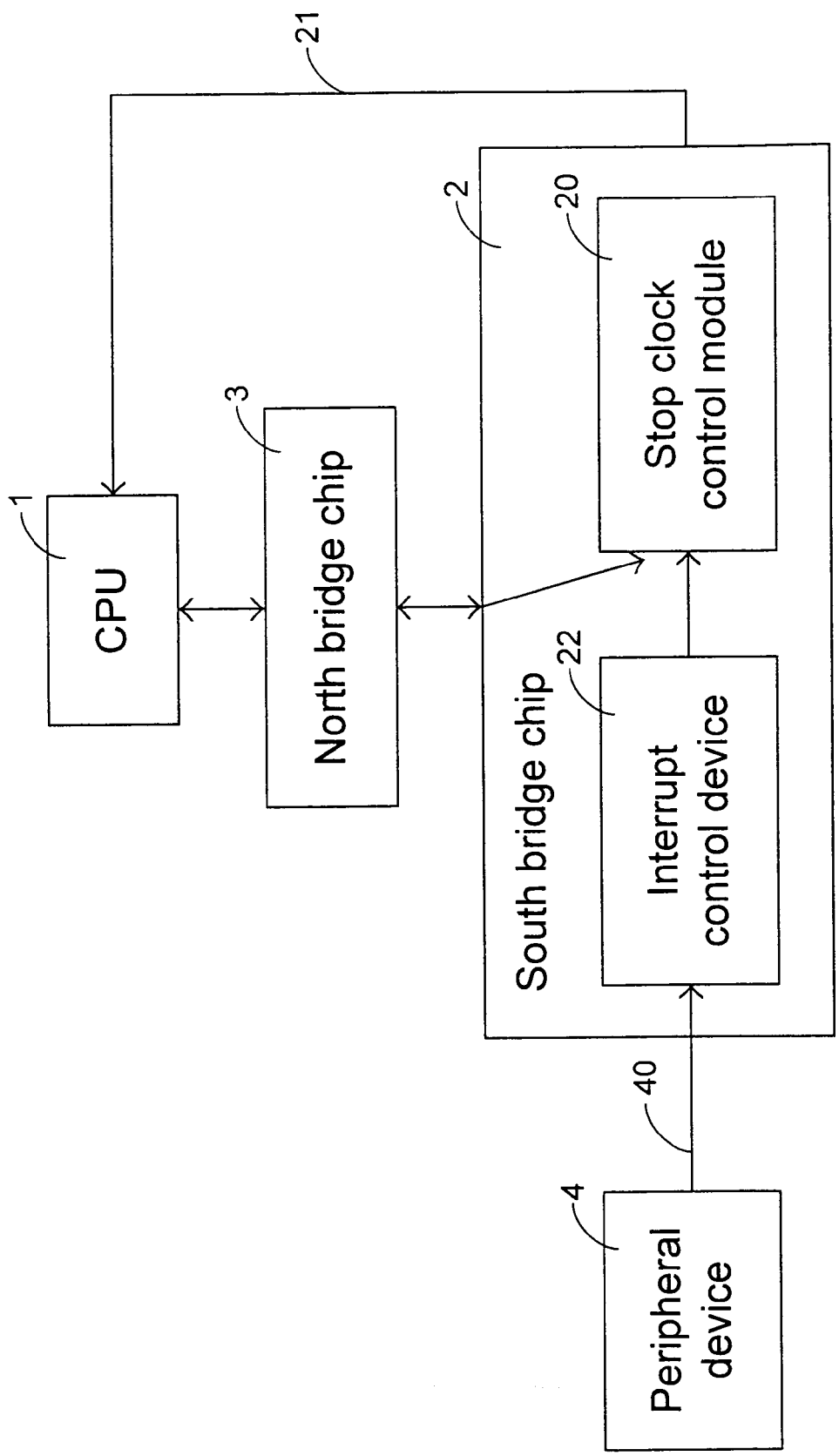
FIG. 1 is a functional block diagram illustrating a conventional interruption control means of a computer system.
Figure 2:
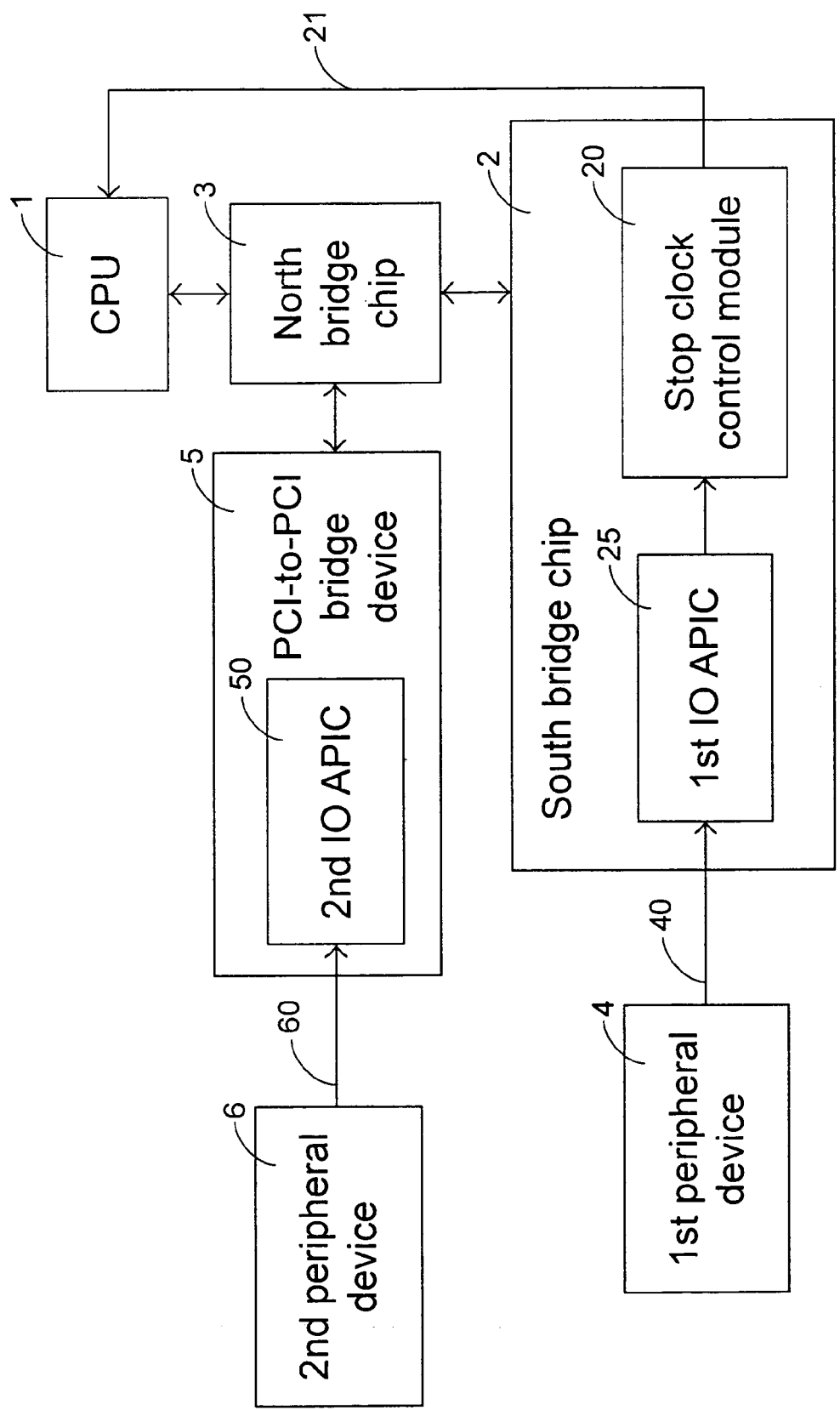
FIG. 2 is a functional block diagram illustrating another conventional interruption control means of a computer system.
Figure 3:
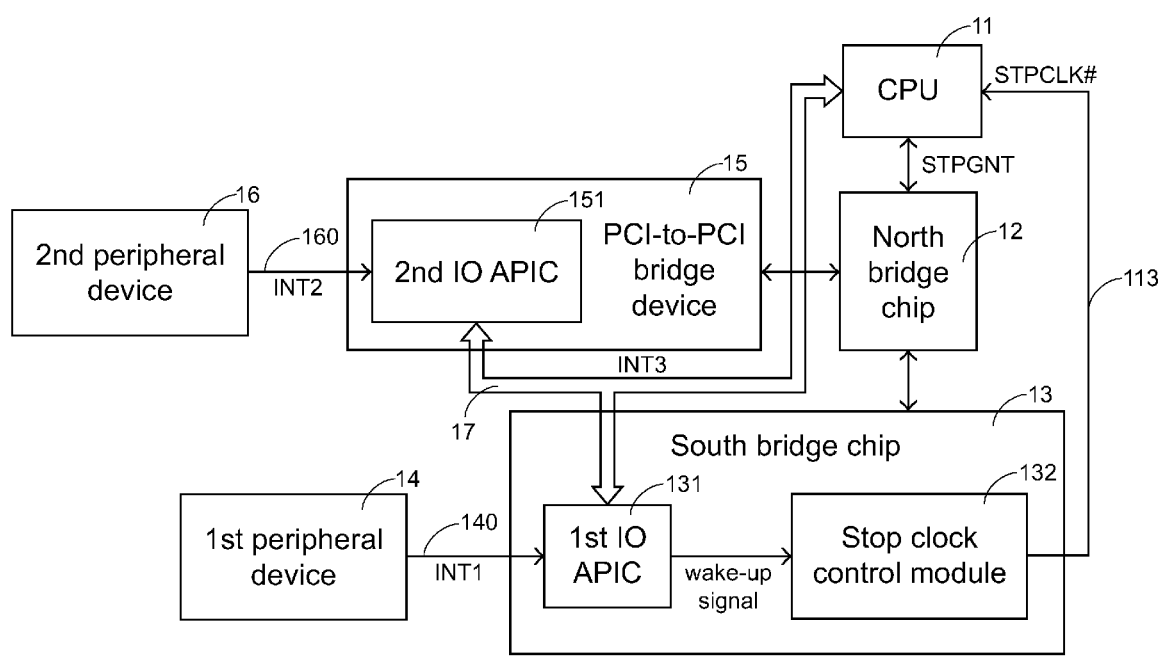
FIG. 3 is a functional block diagram illustrating an interruption control system according to a preferred embodiment of the present invention.

Referring to FIG. 3, an interruption control system according to a preferred embodiment of the present invention is shown. The interruption control system includes first and second input/output advanced programmable interrupt controllers (IO APICs) 131 and 151. A first peripheral device 14 is coupled to the south bridge chip 13 where the first IO APIC 131 is disposed and a stop clock control module 132 is arranged. A second peripheral device 16 is coupled to the north bridge chip 12 via a PCI-to-PCI bridge device 15 where the second IO APIC 151 is disposed. The second IO APIC 151 of the interruption control system communicates with the first IO APIC 131 and the CPU 11 via an interruption control device bus 17, which for example, can be implemented with an advanced programmable interrupt control bus.

When the computer system is going to enter a power-saving state in response to the request from the operating system (OS), the CPU 11 asserts a sleep command to the south bridge chip 13. In response to the sleep command, the stop clock control module 132 of the south bridge chip 13 asserts a stop clock signal STPCLK# to the CPU 11 via a clock signal pin 133. Once the STPCLK# signal is generated, the CPU 11 asserts a stop grant signal STPGNT to the south bridge chip 13 via the north bridge chip 12 through data buses connecting thereto. In response to the STPGNT signal, the CPU 11, as well as the entire computer system, enters the power-saving state, e.g. C2 or C3 mode, so as to reduce power consumption.

Once a first interrupt signal INT1 issued by the peripheral device 14 via an interrupt signal pin 140 is received, the first IO APIC 131 of the south bridge chip 13 asserts a wake-up signal to trigger the stop clock control module 132 of the south bridge chip 13 to de-assert the STPCLK# signal. Accordingly, the power-saving state of the computer system is deactivated, and the CPU 11 and the entire computer system are awaked to recover to the normal operation state. Meanwhile, the first IO APIC 131 also asserts an interrupt signal to the interruption control device bus 17.

Figure 4:
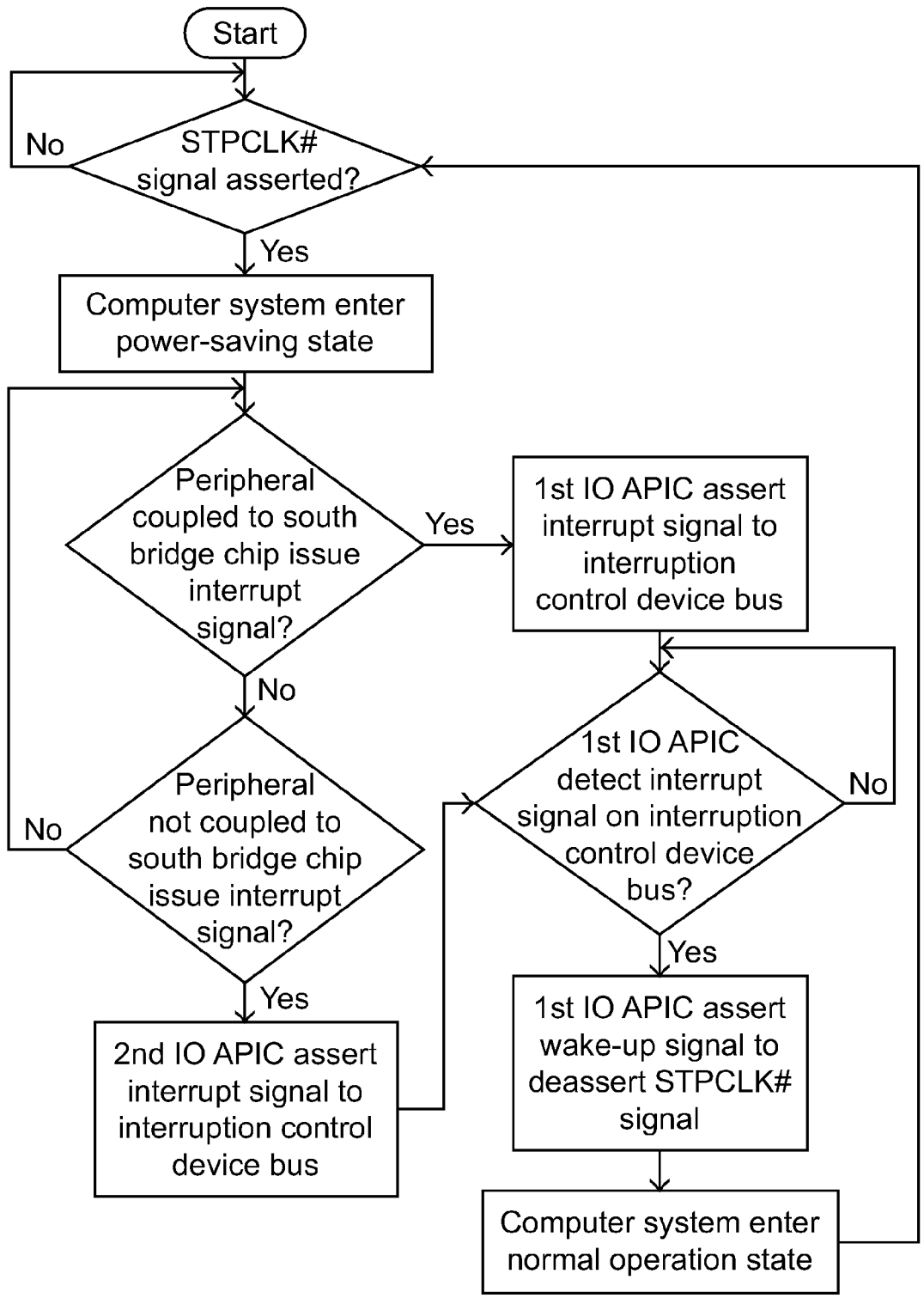
FIG. 4 is a flowchart illustrating an interruption control method of the system of FIG. 3.

On the other hand, it is also possible for the first IO APIC 131 to assert the wake-up signal without receiving the first interrupt signal. According to the present invention, the first IO APIC 131 of the south bridge chip 13 keeps on monitoring the interruption control device bus 17. When a second interrupt signal INT2 is issued from the second peripheral device 16 to the PCI-to-PCI bridge device 15 via an interrupt signal pin 160, a third interrupt signal INT3 is transmitted in response from the second IO APIC 151 to the interruption control device bus 17. In response to the third interrupt signal INT3, the first IO APIC 131 of the south bridge chip 13 asserts the wake-up signal to trigger the stop clock control module 132 of the south bridge chip 13 to de-assert the STPCLK# signal, thereby deactivating the power-saving state of the computer system is deactivated. The interruption control method described above is summarized in FIG. 4.

From the above description, the interruption control system of the present invention can effectively wake up the computer system from the power-saving state to the normal operation state when either the peripheral device coupled to the south bridge chip or the peripheral device not coupled to the south bridge chip asserts an interrupt signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interruption control system for use with a computer system, said computer system comprising a CPU, a north bridge chip, a south bridge chip, a first peripheral device and a second peripheral device, said interruption control system comprising:
   a first input/output interruption controller coupled to said first peripheral device and said south bridge chip, and asserting a wake-up signal to said south bridge chip in response to a first interrupt signal issued by said first peripheral device so as to deactivate a power-saving state of said computer system;
   a second input/output interruption controller coupled between said second peripheral device and said north bridge chip for communicating said second peripheral device with said north bridge chip, and in response to a second interrupt signal issued by said second peripheral device, asserting a third interrupt signal; and
   an interruption control device bus interconnecting said first input/output interruption controller, said second input/output interruption controller and said CPU, said first input/output interruption controller asserting said wake-up signal to deactivate said power-saving state of said computer system in response to said third interrupt signal asserted by said second input/output interruption controller and transmitted on said interruption control device bus.

2. The interruption control system according to claim 1 further comprising a stop clock control module coupled to said first input/output interruption controller and said CPU, and asserting a stop clock signal to have said CPU deactivate said power-saving state in response to said wake-up signal.

3. The interruption control system according to claim 2 wherein said first input/output interruption controller and said stop clock control module are integrated into said south bridge chip.

4. The interruption control system according to claim 2 wherein said first input/output interruption controller is an input/output advanced programmable interrupt controller.

5. The interruption control system according to claim 1 wherein said second input/output interruption controller is an input/output advanced programmable interrupt controller disposed in a bus bridge chip between said north bridge chip and said second peripheral device.

6. The interruption control system according to claim 5 wherein said bus bridge chip is a PCI-to-PCI bridge chip.

7. The interruption control system according to claim 1 wherein said interruption control device bus is a bus for an advanced programmable interrupt control device.

8. An interruption control system for use with a computer system, said computer system comprising a CPU, a north bridge chip, a south bridge chip, a first peripheral device and a second peripheral device, said interruption control system comprising:
   a first input/output interruption controller coupled to said first peripheral device and said south bridge chip;
   a second input/output interruption controller coupled between said second peripheral device and said north bridge chip for communicating said second peripheral device with said north bridge chip, and further communicating with said first input/output interruption controller and said CPU via an interruption control device bus; and
   a stop clock control module coupled to said first input/output interruption controller and said CPU, and deactivating a power-saving state of said computer system in response to an interrupt signal from either of said first and second peripheral devices.

9. The interruption control system according to claim 8 wherein said first input/output interruption controller monitors said interruption control device bus to determine whether said interrupt signal from said second peripheral device is issued via said second input/output interruption controller.

10. The interruption control system according to claim 8 wherein said first input/output interruption controller and said stop clock control module are integrated into said south bridge chip.

11. The interruption control system according to claim 8 wherein each of said first and second input/output controllers is an input/output advanced programmable interrupt controller.

12. The interruption control system according to claim 8 wherein said second input/output interruption controller is disposed in a PCI-to-PCI bridge chip.

13. The interruption control system according to claim 8 wherein said interrupt control device bus is a bus for an advanced programmable interrupt control device.

14. An interruption control method of a computer system, said computer system comprising a CPU, a north bridge chip, a south bridge chip, a bus bridge chip and a specified bus interconnecting said south bridge chip, said bus bridge chip and said CPU, and said method comprising steps of:
   asserting a stop clock signal from a stop clock control module disposed in said south bridge chip to said CPU in response to a sleep command from said CPU for entering a power-saving state of said computer system; and
   de-asserting said stop clock signal by said stop clock control module in response to a first interrupt signal asserted by a first peripheral device communicating with said CPU via said south bridge chip or a second interrupt signal asserted by said second peripheral device communicating with said CPU via said bus bridge chip and said north bridge chip, thereby deactivating the power-saving state of said computer system,
   wherein in response to said second interrupt signal from said second peripheral device, a third interrupt signal is asserted and transmitted to said specified bus by said bus bridge chip, and said stop clock control module de-asserts said stop clock signal when said south bridge chip detects said third interrupt signal on said specified bus.

15. The method according to claim 14 wherein a wake-up signal is asserted by a first input/output advanced programmable interrupt controller disposed in said south bridge chip to have said stop clock control module de-assert said stop clock signal when said input/output advanced programmable interrupt controller detects said third interrupt signal on said specified bus.

16. The method according to claim 15 wherein said bus bridge chip includes a second input/output advanced programmable interrupt controller, and said specified bus interconnects said first input/output advanced programmable interrupt controller, said second input/output advanced programmable interrupt controller and said CPU.

17. The method according to claim 16 wherein said bus bridge chip is a PCI-to-PCI bridge chip.

* * * * *